Figure 1:
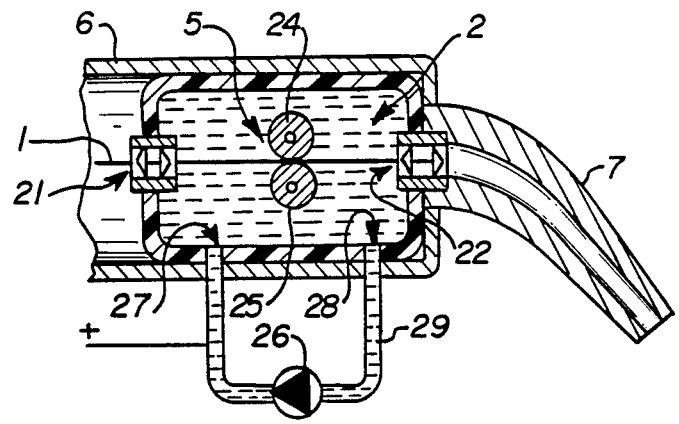

United States Patent [19]

Niinivaara

[11] Patent Number: 4,837,420

[45] Date of Patent: Jun. 6, 1989

[54] METHOD AND APPARATUS FOR CONDUCTING CURRENT TO AN ELECTRODE IN ARC WELDING, ARC CUTTING OR THE LIKE OPERATIONS

[75] Inventor: Ensi K. J. Niinivaara, Koria, Finland

[73] Assignee: Oy GSS General Sea Safety Ltd., Helsinki, Finland

[21] Appl. No.: 44,848

[22] PCT Filed: Jul. 23, 1986

[86] PCT No.: PCT/FI86/00084

§ 371 Date: May 15, 1987

§ 102(e) Date: May 15, 1987

[87] PCT Pub. No.: WO87/00470

PCT Pub. Date: Jan. 29, 1987

[30] Foreign Application Priority Data

Jul. 24, 1985 [FI] Finland .................................. 852875

[51] Int. Cl.4 .............................................. B23K 9/00
[52] U.S. Cl. ................. 219/137 R; 219/136; 219/137.2
[58] Field of Search ............... 219/137 R, 137.2, 136, 219/137.8, 177.61, 71, 74; 339/118 RY; 226/181, 188

[56] References Cited

U.S. PATENT DOCUMENTS

| 1,433,331 | 10/1922 | Angstrom | 219/119 |
| 3,125,649 | 3/1964 | Cyr | 339/118 R Y |
| 3,211,883 | 10/1965 | Zimmermann | 219/74 |
| 3,230,343 | 1/1966 | Nagy | 219/137.61 |
| 3,553,423 | 1/1971 | Doxey | 219/74 |
| 4,056,703 | 11/1977 | Mandoki | 219/71 |

FOREIGN PATENT DOCUMENTS 2213514 9/1972 Fed. Rep. of Germany .... 219/69 E

Primary Examiner—Clifford C. Shaw
Attorney, Agent, or Firm—Webb, Burden, Ziesenheim & Webb

[57] ABSTRACT

A method of conducting electricity in an arc welding device especially to an arc electrode (1), such as a welding, cutting, cleaning or electrolyte coating electrode, or to a device supporting such electrode, as well as an arc welding device to realize the method. The electrode (1) or the device supporting it is brought to a direct contact before the arc area with a flowing, preferably liquid, medium in contact with the power supply. The device for conducting electric current comprises a chamber (2) adapted inside the casing (6) and including flowing, preferably liquid, medium, which is in electrically conductive contact to the power supply and the electrode (1) or the device supporting it.

10 Claims, 1 Drawing Sheet

METHOD AND APPARATUS FOR CONDUCTING CURRENT TO AN ELECTRODE IN ARC WELDING, ARC CUTTING OR THE LIKE OPERATIONS

This invention relates to the process and method of conducting electricity in equipment and devices for arc welding, cutting or similar operations and also to an arc welding device to carry out the method. The particular object of the invention is a method of directing the electric current in this type of equipment to the arc electrode, hereafter generally referred to as the end part, or equipment, as the rotating drive shaft or sleeve, to which the end part is fixed.

Traditionally the electric current is conducted to the welding electrodes or drive shaft in the arc welding device by mechanical contact members to be pressed in contact with welding electrode or shaft and connected with electric conductors, such as spring loaded clamp cheeks or carbon brushes, which wear out in the use.

Underwater welding and arc cutting have been in the recent years an object of growing interest and development work. Repairs and servicing of drilling platforms, underwater gas and oil pipes, ships and docks are the processes in which underwater welding has mostly been used. The objects are in these cases generally such, that their lifting to the water surface is impossible or very costly. The objective of underwater welding, as well as in welding generally, is always the achievement of the highest quality welds. Then it is of vital importance that the conduction of electricity to the end part of the arc welding device to be targeted towards the worksite will be even and uninterrupted and that the changing of the end part electrode should be easy and swift even if the size is being changed.

Previously recognizable problems with welding and cutting methods and equipment particularly connected with the conduction of necessary electricity have been for instance the reliability of mechanical contacts. In addition to strength related failures, the contamination has produced contact disturbances resulting in welding faults or the welding or cutting process might completely be disrupted or interrupted. Another drawback is, that the adjustment possibility of contact members for end parts with different sizes and shapes is rather limited.

The objective of the present invention is to eliminate the above-mentioned drawbacks and limitations to arc welding processes and equipment already known in the art and to achieve a method for electrical conducting, to which the invention particularly is connected, which is more reliable and simple and guarantees the use of the welding device or more generally the arc welding device in all welding applications. It would also enable the use of the arc welding device in a more convenient and flexible way in the remote-controlled submarine use of robots, which significantly reduces both the costs and the risks connected to the underwater operations.

This objective has been achieved with the method and arc welding devices according to the invention the characteristic features of which are presented in the appended claims.

The primary feature of this invention is that no moving parts are necessary for the conducting of electricity and so the device according to the invention is very reliable, simple and easily adaptable to different objects of use, and that by using the solution of the invention the electric current can very easily be conducted also to rotating welding, cutting, cleaning and/or coating electrodes. This means that this method can successfully be utilized in all arc welding applications. An especially beneficial feature of the electrical conducting according to the invention is the production of an even magnetic field which, particularly in welding applications, results in an even arc.

Figure 2:
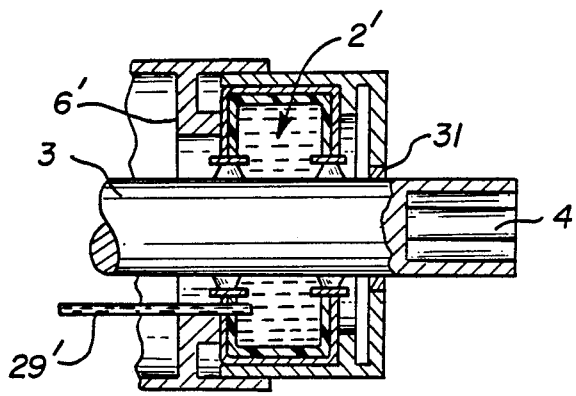
Figure 3:
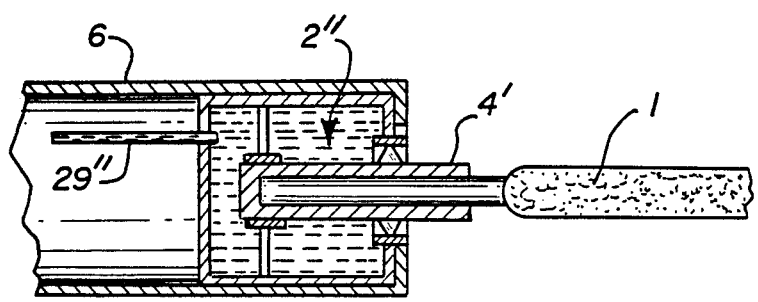

The method and arc welding device according to the invention are described in the following by some preferable applications with reference to the accompanying drawings, in which FIG. 1 shows a cross section of a continuous feeding welding equipment, FIG. 2 shows a cross section of an arc welding device with a rotatable drive shaft to be provided with an end part for welding, cutting, cleaning and/or electrolytical coating, and FIG. 3 shows an arc welding device espically adapted for rod welding.

According to the primary feature of the invention for the conduction of electricity to the electrodes (1) which hereafter are referred to as the end part, or to a drive shaft 3 or sleeve part 4 to which the end part is designed to be connected, for various applications such as arc welding, cutting, cleaning or electrolytical coating, the end part 1 or drive shaft 3 or sleeve part 4 to which the end part 1 will be connected is brought before the arc area to the electrically conducting contact with a flowing, preferably liquid, medium, as for instance mercury.

In this advantageous application the above-mentioned objective is relized by placing the drive shaft 3 to extend or by guiding the welding electrode in the form of wire (1) to penetrate through the chamber 2 full of medium or by adapting the sleeve part 4 to extend to the chamber 2 at least partially filled with the medium, so that the electrical current is conducted from the medium to the end part 1 either directly or indirectly through the drive shaft 3 or sleeve part 4 or locking arrangements possibly placed in them.

For the arc to be ignited the flowing medium in the chamber 2 is electrically connected to one of the power supply terminals, for example the "+"-terminal, and the basic material in the worksite correspondingly to the other power supply, say "−"-terminal. According to one advantageous embodiment of the invention the medium is flowed between the power supply and the chamber 2, so that the flowing medium drives the equipment 5 drawing the welding wire 1. It must, however, be noticed that flowing of the medium is not necessary for the operation of the invention, but that the chamber 2 can also be made as a closed space and the medium in it can be connected also by electrical conductors to the power supply. In this case the electrical current needed for the drawing equipment 5 of the welding wire 1 can be taken from the medium through the electrical transformator.

In the continuously fed arc welder application of the FIG. 1, in which the conduction method of the electric current to the welding wire 1 according to the invention has been realized, the reference number 6 means the casing of the welding device, inside which has been formed a chamber 2 containing the medium as described above. The chamber 2 itself is for the elimination of current losses produced advantageously from a material with electrically insulating properties, whereby the use of the welding device is also secured.

As shown in FIG. 1 the chamber 2 in this exemplary case includes the inlet 21 and outlet 22 for the welding wire 1. Both of the said openings are sealed against the outflow of the medium and in the underwater operations inflow of water. To the outlet 22 has been directly connected the mouthpiece 7 of the welding device projecting in curved form from the other end of the body part in order to support and guide the path of the welding wire 1 to the welding object.

Inside the chamber 2 has also been mounted in bearings a pair of rollers 24, 25 functioning as the drawing device 5 for the welding wire and rotating in opposite directions, so that they draw the welding wire 1 continuously from the inlet 21 towards the outlet 22. As stated before the operation of the pair of rollers 24, 25 can be carried out for example, by a hydraulically flowing medium or electric current taken from the medium through an electrical transformer. In both cases it is possible to arrange the rotational speed of the rollers as steplessly adjustable for instance by a trigger adapted to the body part, which trigger in the hydraulic use affects to the circulating device 26 of the medium for the adjustment flow rate or quantity and in the electrical use to the resistance in the electrical transformer to change the magnitude of the electric current operating the pair of rollers.

For the hydraulic use the chamber 2 comprises the inlet 27 and the outlet 28 for the medium. As described before the flow openings 27 and 28 are connected to each other by the medium flow channel 29, in which has been mounted a circulating device 26, e.g. a suitable liquid pump.

According to one advantageous application of the invention the inlet 21 and the outlet 22 can be connected together by a tubular contact organ made of electrically conductive material, which during the welding process is pressed against the welding wire to conduct the welding current. The advantage in this particular application is that the chamber 2 can be made absolutely tight and that the welding wire 1 is supported all the time along the whole length of the welding device, and also that the tubular contact organ facilitates the adaptation of the welding wire 1 through the chamber 2. To make the entrance of the welding wire easier also a conically towardas the outlet 22 tapering guide sleeve can be placed in the chamber.

In FIG. 2 has been shown an arc welding device according to aother application of the invention, namely the arc welding device provided with a rotating drive shaft 3. To the sleeve part 4 at the end of the axle is to be connected and possibly locked by suitable, for instance clamp-like locking means the arc welding, cutting, cleaning and/or electrolytically coating end part to rotate along with the axle.

In the exemplary case of FIG. 2 the electric current is fed to the mentioned end part through the drive shaft 3. To achieve this in the casing 6 of the device has been formed a chamber 2, which is filled or to which is fed or in which is circulated continuously electrically conductive advantageously liquid medium, such as mercury. The medium is electrically connected to the power supply by a lead 29' and it is in continuous contact with the outer perimeter of the drive shaft 3. To eliminate the current losses the chamber 2 itself has been made of electrically insulating material and between the drive shaft 3 and the rotating device has been adapted a spacer 31 of electrically insulating material, whereby the electric current is introduced through the drive shaft 3 and the sleeve part 4 to the end part.

To make the underwater use of the device as sure as possible the chamber 2 as well as the clearance between the casing 6 and the drive shaft 3 has been sealed against leakages directed inwards as well as outwards. In the sealing for instance spring-loaded slip ring gaskets or lip gaskets can be used depending on the application and the loads applied to the sealings. In deeper work conditions the use of the slip ring gaskets becomes necessary.

In FIG. 3 has been shown an arc welding device according to a third advantageous application of the invention and intended especially for rod welding. Electricity is conducted to the end part 1, which in this case is a welding rod, through the sleeve part 4 in the casing 6 of the device. The other end of the welding rod has been inserted into the sleeve part 4, the other end of which extends partially to the chamber 2 inside the casing 6, in which chamber there is or into which it is fed or in which continuously is circulated flowing, preferably liquid medium, such as mercury. The chamber 2 itself is also in this exemplary case made of electrically insulating material and the medium has been electrically connected by a lead 29 to the either terminal of the power supply.

The invention has been described above only by some of its advantageous applications. This, of course, does not limit its sphere, but the invention can be varied in its details even significantly in the scope of the appended claims.

I claim:

1. A method of conducting electric current in an arc welding device to an arc electrode (1) for welding, cutting, cleaning and electrolytical coating, or to a drive shaft (3) or a sleeve part (4) and like member supporting the arc electrode, characterized in that the electrode (1) or the member supporting it is brought into contact with flowing liquid, electrically conductive medium, which is connected to a power supply and moving the arc electrode or the member supporting the arc electrode by way of a force generated by said flowing medium.

2. A method according to claim 1, characterized in that mercury is used as the medium.

3. A method according to claim 2, characterized in that mercury is circulated between a mercury chamber (2) in the arc welding device and the power supply.

4. Arc welding device for conducting electric current in an arc electrode or in an electrode supporting member comprising a chamber inside a casing (6) and includidng a flowing liquid, electrically conductive medium in said chamber, which is in electrically conductive contact with a power supply and the arc electrode (1) or the arc electrode supporting member, said chamber having inlet means for introducing said liquid medium thereto and having outlet means for withdrawing the liquid medium therefrom to effect said flow of liquid medium in said chamber and including means in said chamber responsive to a force generated by said flowing liquid medium for moving the arc electrode or the arc electrode supporting member.

5. Arc welding device according to claim 4, characterized in that the arc electrode is a continuously fed welding or cutting wire (1), and wherein the chamber (2) comprises:

an entrance inlet (21) and an outlet (22) for the wire (1), drawing devices (5) for continuous drawing of the wire from the inlet (21) inside the chamber (2) and for guiding the wire from the outlet (22) through a mouthpiece (7) fixed to an end of the casing (6) towards a worksite, and at least one medium inflow opening (27), to which is connected a medium flow channel (29) adapted between the chamber (2) and the power supply.

6. Arc welding device according to claim 5, characterized in that the chamber (2) comprises also the medium outlet (28), and that in- and outflow openings (27 and 28) have been connected together by a medium circulating channel (29) passing through the power supply and provided with a medium circulating device (26).

7. Arc welding device according to claim 6, characterized in that the drawing devices (5) consist of at least one pair of rollers or rolls (24, 25) receiving a driving force from an hydraulic pressure generated by the flowing medium.

8. Arc welding device according to claim 5, characterized in that the drawing devices (5) receive their drive from the electrically conductive medium by an electric current transformer.

9. Arc welding device according to claim 4, in that the member supporting the arc electrode is a drive shaft (3) rotating the arc electrode, characterized in that said drive shaft (3) has been adapted to extend through the chamber (2) formed inside the casing (6), so that the medium is in direct electrically conductive contact with an outer perimeter of the drive shaft (3).

10. Arc welding device according to claim 4, in which the member supporting the arc electrode is a sleeve part (4) to which the electrode is to be connected, characterized in that the sleeve part (4) has been adapted to extend at least partially into the chamber (2) formed inside the casing (6), so that the medium is in direct electrically conductive contact with an outer surface of the sleeve part (4).

* * * * *